March 10, 1953  A. C. BALLAUER  2,630,984
YAW CONTROL FOR HELICOPTERS
Filed Oct. 13, 1950

*INVENTOR.*
ALB C. BALLAUER,
BY
*Carr & Carr & Gravely,*
ATTORNEYS.

Patented Mar. 10, 1953

2,630,984

UNITED STATES PATENT OFFICE 2,630,984

YAW CONTROL FOR HELICOPTERS

Alb C. Ballauer, Ferguson, Mo., assignor to McDonnell Aircraft Corporation, St. Louis, Mo., a corporation of Maryland Application October 13, 1950, Serial No. 189,926

5 Claims. (Cl. 244—17.19)

1

This invention relates to helicopters not employing tail rotors and, more particularly, to certain new and useful improvements in vertical tail surfaces therefor.

Vertical airfoils are commonly employed as yawing controls on helicopters having counter-rotating or reaction-powered rotors. Heretofore, it has been difficult to make effective use of such airfoils as yaw controls because of variations in direction of the relative wind with changes in the direction of flight and in the rotor downwash. The effects of change in relative wind direction are most marked when airfoils having a substantial aspect ratio are employed. Fixing the span in a direction normal to the air flow experienced under a single flight condition permits effective control under that condition, but, under other flight conditions, the air flow will have a spanwise component, or even be reversed.

To avoid these results, such helicopters usually employ, as vertical surfaces, large plates having an aspect ratio of approximately one. Even with such inefficient rudder surfaces, there remains the problem of fixing their hinge lines, which ought to be normal to the relative wind. Also, during flight in a reverse direction, such controls are either rendered ineffective or destabilized and their sense reversed.

Therefore, the primary object of the present invention is to provide for such helicopters a yaw control which is effective and efficient under all conditions of flight.

A further object is to assure the chordwise flow of the relative wind over a yaw control surface having a high aspect ratio.

Another object is to provide a yawing control whose sense, restoring tendency, and "feel" are not affected by changes in direction of the relative wind arising from changes in flight condition.

An additional object of the present invention is to provide, as a yaw control, a vertical airfoil with a fixed lateral vane near its trailing edge, the assembly being freely rotatable about a lateral axis through its center of gravity in response to changes in the relative wind.

With the above and other objects in view, my invention resides in the novel features of form, construction, arrangement, and combination of parts presently described and pointed out in the claims.

In the accompanying drawings,

Figure 1 is a perspective view of a helicopter incorporating yaw control surfaces embodying my invention, in normal flight;

2

Figure 1:
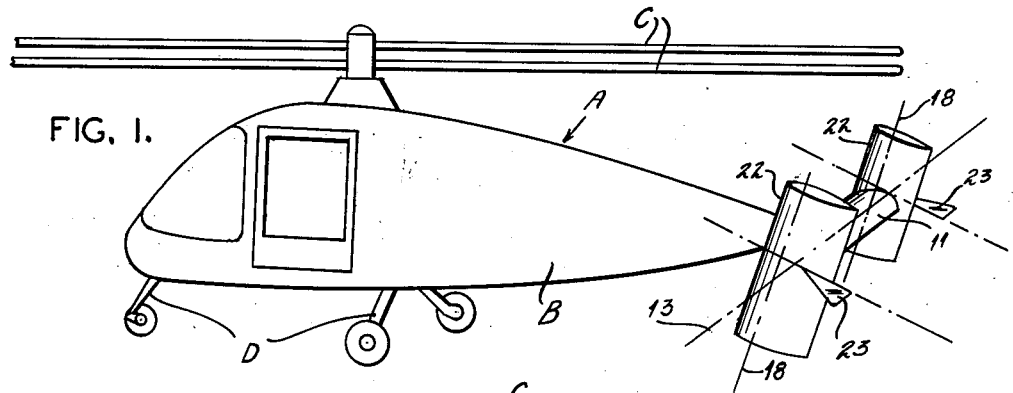
Figure 3:
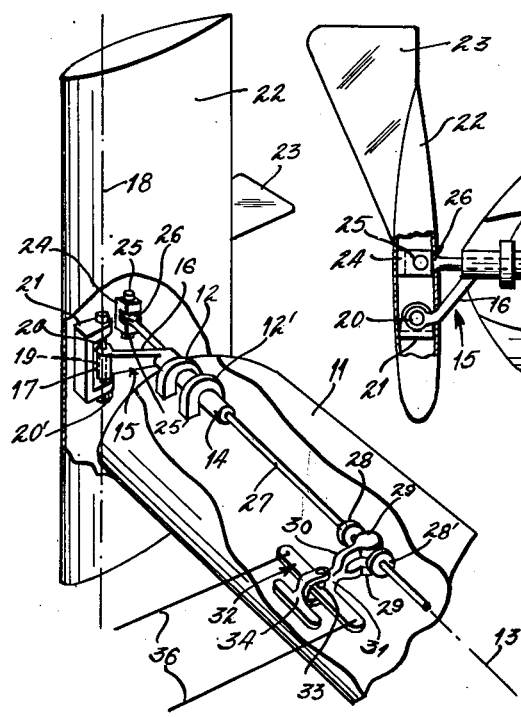
Figure 3 is a fragmentary perspective view of one such yaw control surface and the mechanism associated therewith.
Figure 4:
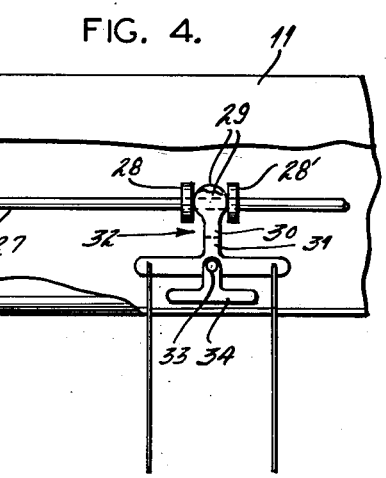
Figure 4 is a plan view of the control surface and mechanism shown in Figure 3.

Referring to the drawings in greater detail, Figure 1 shows a helicopter A having a fuselage B, co-axial rotors C, and a tricycle undercarriage D. Fixed to the aft end of the fuselage B is a horizontal stabilizer 11, having mounted adjacent each of its lateral margins a pair of support bearings 12, 12', aligned on a common lateral axis designated 13. Inasmuch as the control surfaces and associated mechanisms at both sides of the stabilizer 11 are symmetrical, Figures 3 and 4 show one side only.

Projecting through and journaled in each of the pairs of support bearings 12, 12', is the tubular shaft portion 14 of a rudder support bracket 15, having outboard of the margin of the stabilizer 11, a radially- and laterally-projecting arm 16 which terminates in a hinge lug 17. The lug 17 is drilled along an axis lying in a vertical plane and designated 18, to provide a bore 19 accommodating a hinge bolt 20 which is secured by a nut 20'. Pivotally mounted on hinge bolt 20 is a clevis-like hinge fitting 21 rigidly secured to the structure of a vertically presented rudder 22.

In contrast with the rudders usually employed on helicopters the rudders 22 are not plate-like, but are true airfoils. They may have as high an aspect ratio as desired, subject to the limitations of structure and ground clearance.

Secured to each rudder 22 near its trailing edge and extending therebeyond is a lateral supplementary airfoil or vane 23 so mounted that its line of zero lift is normal to the rudder hinge axis 18. The supplementary airfoil 23 is preferably of symmetrical airfoil section, with its leading edge faired into the rudder.

On the inwardly presented surface of each rudder 22 is mounted a control fitting 24 to which is pivotally attached by a bolt 25 and nut 25', the rod end 26 of a push-pull rod 27. The push-pull rod 27 extends through, in concentricity with and spaced for unimpeded reciprocal movement within, the tubular shaft portions 14 of the rudder brackets 15; and is pivotally secured at its opposite end to a similar control fitting (not shown) upon the corresponding rudder 22.

Fixed upon push-pull rod 27 substantially intermediate its end is a pair of spaced collars 28, 28', the inner faces of which abut cam-wise against vertically aligned lugs 29 integrally formed on the opposed ends of a fork member 30 which is unitary with an arm 31 of a bell-crank 32. The bell-crank 32 is swivel-mounted on a pin 33 supported at its end in a bifurcated fitting 34 which is secured to the structure of the stabilizer 11. Operatively connected to the bell-crank 32 at laterally opposite points thereon are the terminals of rudder control cables 36.

In order that the high aspect rudders 22 may be readily rotated so that the direction of the relative wind is precisely chordwise, the surfaces are so balanced that the axis 13 passes through the center of gravity of the masses which rotate in the support bearings 12, 12'. Those masses to be taken into account are the rudder 22 and supplementary airfoil 23, together with the rudder support bracket 15, hinge fitting 21, and bolt and nut 28, 28', respectively. The push-pull rod 27, its ends 26, and the fittings 24 and bolts 25 to which they attach normally lie along the axis of rotation 13 and are not substantially displaced by angular movement of the rudders 22. The radial projection of the support bracket arm 16 will, therefore, equal the distance between such center of gravity and the rudder hinge axis designated 18.

Considerations of stability require that the hinge axis 18 be located forward of the aerodynamic center of the rudder 22. Inasmuch as the center of gravity of these rotatable masses will be well aft of the hinge axis 18, the arm through which push-pull rod 27 acts will conform to accepted design criteria.

Yaw controls constructed, as herein described, will be freely rotatable in the bearings 12, 12', without disturbing the operative relationship of the cams 29, that is, operation of the controls is unimpaired by rotation of the yaw control surfaces. To effect such rotation requires merely such force as will overcome the rotational moment of inertia and the friction in the said bearings 12, 12', and in control cam lugs 29. Save for overcoming these, there will be no aerodynamic lift forces whatsoever operating upon the supplementary symmetrical airfoils 23. The required lift forces are never great, because the aerodynamic center of the supplementary airfoils 23 is well aft of the axis of rotation 13.

These supplementary airfoils 23 serve, then, as fully-rotating vanes into the relative wind. The position they assume is determined by the direction of the relative wind acting upon them independently of its speed. Regardless of the direction and speed of the relative wind, it will approach the leading edge of the rudder in a precisely chordwise direction.

Figure 2:
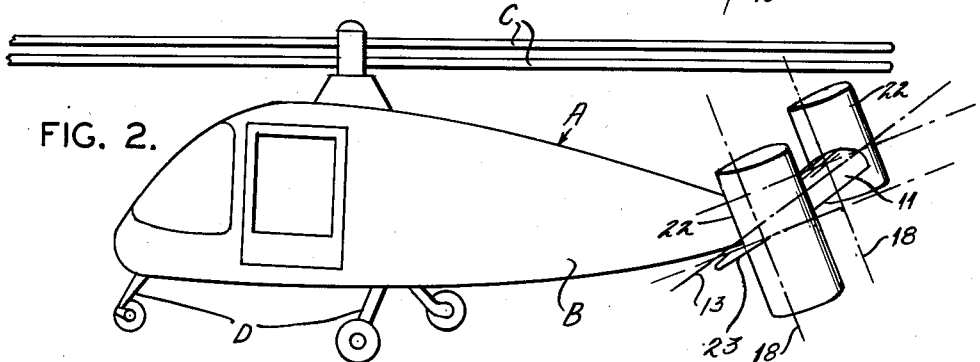
Figure 2 is a similar view showing such helicopter in reverse flight.

An example of the operation of the invention, which illustrates some of its unique features, is as follows: if the helicopter is proceeding in level forward flight, the flow over the empennage surfaces will have a downward component due to the wash of the rotors, and the rudders 22 and supplementary airfoils 23 will assume a position such as shown in Figure 1. If the forward speed is retarded, as for hovering, the relative wind will be more sharply downward and the assemblies will rotate so that the supplementary airfoils 23 are brought well below the axis of rotation 13 and in line with the relative wind direction. Should the helicopter be caused to fly backwards, these will assume a reverse position such as shown in Figure 2. It is to be noted that even in this reverse position the rudders 22 are presented to the air stream so that the air flow is precisely chordwise.

The advantages resulting will be readily apparent. Referring first to the use of high aspect ratio rudders, their most important benefit is the increase in control effectiveness at slow speeds and during hovering flight. Another important advantage of the present invention is the preservation of control effectiveness, sense and "feel." As to the sense of the rudder controls, it is to be noted that during rearward flight the direction of rotation in yaw resulting from lateral movement of the push-pull rod 27 is not affected by a change in linear direction of the helicopter from forward to rearward. If, in the mechanism illustrated, push-pull rod 27 is moved to the right, the resultant deflection of the rudders 22 will cause a clock-wise yawing whether the helicopter is proceeding forward, as in Figure 1, or rearward, as in Figure 2.

In the drawings, Figures 3 and 4, the push-pull rod 27 is linked to the control fittings 24 by bolts 25 in such manner as to require the left and right rudders 22 to rotate together. If desired, fittings permitting relative rotation, such as ball-and-socket fittings, might be substituted, so as to permit the rudders 22 to rotate entirely independently of each other.

It is further apparent that, while I have illustrated a twin-rudder empennage, if it were desired to employ only a single rudder, bearings such as 12, 12', might readily be installed on a lateral axis in a tail boom and only one of the rotatable assemblies utilized.

It should be understood that changes and modifications in the form, construction, arrangement, and combination of the several parts of the yaw control for helicopters may be made and substituted for those herein shown and described without departing from the nature and principle of the present invention.

I claim:

1. A yaw control assembly for helicopters comprising a rudder, a lateral-span supplementary airfoil affixed to said rudder aft of its center of gravity and in alignment with its chordline, a rudder bracket hingedly secured to said rudder and integrally incorporating a tubular shaft portion, bearing means for supporting said tubular shaft portion for full rotation about a lateral axis, and rudder control means connected to said rudder and extending through said tubular shaft portion.

2. A yaw control assembly for helicopters comprising a rudder, a lateral-span supplementary airfoil affixed to said rudder aft of its center of gravity and in alignment with its chordline, a rudder bracket hingedly secured to said rudder and integrally incorporating a tubular shaft portion, bearing means for supporting said tubular shaft portion for full rotation about a lateral axis, and a rudder control rod pivotally secured at one end to said rudder and extending through said tubular shaft portion for linear actuation through said tubular shaft portion, the assembly being statically balanced about said lateral axis.

3. A yaw control assembly for helicopters comprising a rudder, a lateral-span supplementary airfoil affixed to said rudder aft of its center of gravity and in alignment with its chordline, a rudder bracket hingedly secured to said rudder and integrally incorporating a tubular shaft portion, bearing means for supporting said tubular shaft portion for full rotation about a lateral axis, a rudder push-pull rod pivotally secured at one end to said rudder and extending concentrically through said tubular shaft portion, and means for actuating said push-pull rod linearly to effect angular deflection of said rudder.

4. A yaw control assembly for helicopters comprising a rudder having an aspect ratio greater than one, a lateral-span supplementary symmetrical airfoil affixed to said rudder aft of its center of gravity and in alignment with its chordline, a bracket hingedly secured to said rudder and integrally incorporating a laterally extending tubular shaft portion, bearing means for supporting said tubular shaft portion for full-floating rotation about a lateral axis responsive to the direction of the relative wind for chordwise alignment therewith, the assembly being statically balanced about said lateral axis, a push-pull rod pivotally secured at one end to said rudder and extending through said tubular shaft portion, and means for actuating said push-pull rod linearly to effect angular deflection of said rudder with reference to its hinged bracket, said push-pull rod being adapted for rotation with said rudder.

5. For use with a helicopter having a laterally-extending stabilizer structure, a yaw control assembly comprising a pair of rudders disposed at either end of such stabilizer structure and equidistant from the plane of symmetry of the helicopter, a lateral-span supplementary symmetrical airfoil affixed to each said rudder aft chordwise of its center of gravity and in alignment with its chordline, a bracket hingedly secured to each said rudder and integrally incorporating an inward-extending tubular shaft portion, bearing means mounted within such stabilizer structure for supporting said tubular shaft portion for full-floating rotation about a common lateral axis and responsive to the direction of the relative wind for chordwise alignment therewith, the assemblies being statically balanced about said lateral axis, a push-pull rod pivotally secured at its ends to the inner surfaces of said rudders and extending between said rudders and through said tubular shaft portions, and means for actuating said push-pull rod linearly to effect the angular deflection of said rudders jointly with reference to their said hinged brackets, said push-pull rod being adapted for rotation with said rudders.

ALB C. BALLAUER.

REFERENCES CITED

The following references are of record in the file of this patent:

UNITED STATES PATENTS

| Number | Name | Date |
| --- | --- | --- |
| 2,081,957 | Roche | June 1, 1937 |
| 2,371,687 | Gerhardt | Mar. 20, 1945 |